United States Patent

Riederer et al.

[11] Patent Number: 4,732,994
[45] Date of Patent: Mar. 22, 1988

[54] STABILIZED ORGANOPOLYSILOXANE OILS

[75] Inventors: Manfred Riederer, Burghausen; Martin Piehler, Mehring, both of Fed. Rep. of Germany

[73] Assignee: Wacker-Chemie GmbH, Munich, Fed. Rep. of Germany

[21] Appl. No.: 61,630

[22] Filed: Jun. 15, 1987

[30] Foreign Application Priority Data

Jun. 19, 1986 [DE] Fed. Rep. of Germany ....... 3620503

[51] Int. Cl.$^4$ ................................................. C07F 7/08
[52] U.S. Cl. ..................................................... 556/401
[58] Field of Search ......................................... 556/401

[56] References Cited

U.S. PATENT DOCUMENTS 4,230,632 10/1980 Chapman ............................ 556/401
4,344,860 8/1982 Plueddemann ................. 556/401 X
4,644,074 2/1987 Manis et al. ......................... 556/401

Primary Examiner—Paul F. Shaver

[57] ABSTRACT

This invention relates to a method for stabilizing organopolysiloxane oils containing triorganosiloxy groups in their terminal units, in which the organopolysiloxane oils are contacted with compounds having the formulas:

$$R_3'SiX \text{ or } (R_3'Si)_2Y,$$

where R' represents the same or different hydrocarbon radicals having from 1 to 18 carbon atoms and halogenated hydrocarbon radicals having from 1 to 18 carbon atoms; X is a halogen atom, a hydrogen atom, a hydroxyl group or a monovalent radical that consists of nitrogen, hydrogen, oxygen and from 0 to 6 carbon atoms and which is bonded to the silicon atom via an oxygen or a nitrogen atom; Y is a divalent radical selected from the group consisting of an oxygen atom, an NH radical, an NR'' radical, or a divalent radical consisting of nitrogen, hydrogen, oxygen and from 0 to 6 carbon atoms, which is bonded to the silicon atoms via oxygen and/or nitrogen atoms; and R'' is a hydrocarbon radical having from 1 to 8 carbon atoms. These stabilized oils may be used as power transmission fluids, especially in viscous clutches.

6 Claims, No Drawings

STABILIZED ORGANOPOLYSILOXANE OILS

The present invention relates to stabilized organopolysiloxane oils, particularly to a method for stabilizing organopolysiloxane oils, and more particularly to the use of stabilized organopolysiloxanes as oils in power transmission devices, such as viscous couplings or clutches.

BACKGROUND OF THE INVENTION

Viscous couplings or clutches are clutches that are provided with reciprocally interlocking disks that rotate on a common axis in a housing containing a viscous fluid that is in contact with the frictional surfaces. Such couplings or clutches are, for example, used in different pawls and in interaxial differential gears of land-based vehicles and are described, for example, in German Patent Application No. 21 35 791 (disclosed on February 1972, A.P.R. Rolt et al). When used as components of interaxial differential gears, viscous couplings enable the positive or negative transmission of power from the drive shaft on the other axle or axles. The amount of torque transmitted depends on the difference in the number of rotations between the wheels or pairs of wheels concerned. For example, it becomes possible to prevent the wheels of a vehicle from moving when the vehicle's engine is started. When the viscous coupling or clutch is engaged, the viscous fluid that comes in contact with the frictional surfaces is subjected to high shearing stresses which can cause the temperature of the fluid to exceed 250° C. Heretofore, silicon oils were suitable for this purpose only to a limited extent.

Therefore, it is an object of the present invention to provide stabilized silicon oils. Another object of the present invention is to provide silicon oils whose viscosity does not decrease substantially, even when the temperature of these oils attains 250° C. over an extended period of time. A further object of the present invention is to provide silicon oils which under the operating conditions of viscous couplings do not form gaseous products under those temperatures and pressures. A still further object of the present invention is to provide a method for preparing silicon oils that are stable under elevated temperatures and pressures.

SUMMARY OF THE INVENTION

The foregoing objects and others which will become apparent from the following description are accomplished in accordance with this invention, generally speaking, by providing a method for stabilizing organopolysiloxane oils having triorganosiloxy groups in their terminal units which comprises contacting the organopolysiloxane oils with compounds of the formula

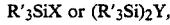

in which R' represents the same or different monovalent hydrocarbon radicals having from 1 to 18 carbon atoms or halogenated monovalent hydrocarbon radicals having from 1 to 18 carbon atoms; X is a halogen atom, a hydrogen atom, a hydroxyl group or a monovalent radical that consists of nitrogen, hydrogen, oxygen and from 0 to 6 carbon atoms and which is bonded to the silicon atom via an oxygen or a nitrogen atom; Y is a divalent radical selected from an oxygen atom, radicals of the formula NH, NR", or a divalent radical consisting of nitrogen, hydrogen and oxygen and from 0 to 6 carbon atoms, which is bonded to the silicon atoms via oxygen and/or nitrogen atoms; and R" represents a hydrocarbon radical having from 1 to 8 carbon atoms.

DESCRIPTION OF THE INVENTION

In the method of this invention, silicon oils which are known, such as for example, those having the formula

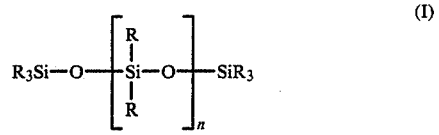

are treated with a compound of the formula

or

in which R is the same or different monovalent hydrocarbon radicals having from 1 to 18 carbon atoms or halogenated monovalent hydrocarbon radicals having 1 to 18 carbon atoms; R', X and Y are the same as above and n is an integer having a value of from 1 to 3000.

Examples of radicals represented by R and R' are alkyl radicals, such as the methyl, ethyl, n-propyl, i-propyl, n-butyl, i-butyl, t-butyl, n-pentyl, neo-pentyl radical, hexyl, heptyl, octyl, decyl and octadecyl radicals; aryl radicals, such as the phenyl and the naphtyl radical; aralkyl radicals such as the benzyl, 1-phenylethyl and the 2-phenylethyl radicals; alkaryl radicals such as the o-, m-, p-tolyl radicals and xylyl radicals; araryl radicals such as the o-, m-, p-diphenyl radicals; halogenated hydrocarbon radicals such as o-, m-, p-chlorophenyl radicals, o-, m-, p-bromophenyl radicals, 3,3,3-trifluoropropyl radicals, the 1,1,1,3,3,3-hexafluoro-2-propyl radical, the heptafluorisopropyl radical and the heptafluoro-n-propyl radical.

Preferred radicals represented by R and R' are fluorinated hydrocarbon radicals, except for aliphatic and saturated radicals, having from 1 to 8 carbon atoms. The methyl radical and the phenyl radical are especially preferred as R and R' radicals.

The hydroxyl radical is preferred as the X radical.

Examples of divalent radicals represented by Y are radicals of the formula:

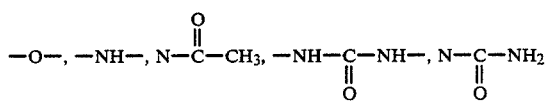

Examples of preferred compounds of formula (II) are triphenylsilanol, methyldiphenylsilanol, dimethylphenylsilanol and trimethylsilanol.

Examples of preferred compounds of formula (III) are hexamethyldisiloxane, hexaphenyldisiloxane, hexamethyldisilazane, hexaphenyldisilazane, tetramethyldiphenyldisilazanes, trimethyltriphenyldisilazanes, dimethyltetraphenyldisilazanes, methylpentaphenyldisilazane, pentamethylphenyldisilazane, bistrimethylsilylacetamide and N, N'-bis-trimethylsilyl urea.

Among the compounds of formulas (II) and (III), hexamethyldisilazane is the preferred compound for the secondary treatment of the organopolysiloxane oils, especially since these stabilized silicon oils are intended to be used in viscous couplings or clutches.

The silicon oils which are to be treated in accordance with this invention and which are to be used in viscous couplings, preferably have a viscosity prior to treatment of from 1000 mm²/s to 500,000 mm²/s, and more preferably from about 5000 mm²/s to 200,000 mm²/s, at 25° C. When used in the method of this invention, the viscosities of the silicon oils of formula (I) change only slightly during the secondary treatment, generally no more than about 10 percent based on their viscosity prior to the treatment.

It is preferred that the method of this invention be carried out at temperatures between 80° and 130° C., and more preferably between 105° and 110° C.

The method of this invention can be carried out at atmospheric pressure, i.e., 0.102 MPa (absolute) or at approximately 0.102 MPa (absolute). However, it may also be performed at higher or lower pressures. Pressures between 900 and 1200 hPa and especially between 1000 and 1050 hPa are preferred.

The method of this invention is preferably carried out over a period of from about 1 to 24 hours and more preferably from about 8 to 12 hours.

Silicon oils which are to be used in viscous couplings and which are to be subjected to the secondary treatment in accordance with this invention, are preferably oils of the formula

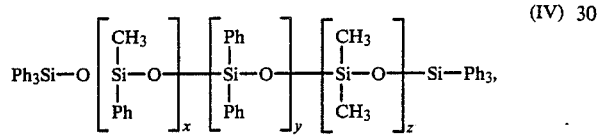

(IV)

where Ph represents a phenyl radical; x, y and z are integers having a value of from 0 to 3000; and where in the sum of x+y+z, x is present in an amount of from 0 to 20 percent and more preferably from 7 to 8 percent, y is present in an amount of from 0 to 20 percent and more preferably from 7 to 8 percent, and z is present in an amount of from 80 to 100 percent and more preferably from 85 to 95 percent.

Although this is not generally indicated in formulas (I) and (IV), up to 5 percent of the diorganosiloxane units can be substituted with units of the formula $SiO_{4/2}$ or monoorganosiloxane units of the formula $RSiO_{3/2}$ [in formula (I)], respectively, $CH_3SiO_{3/2}$ or $PhSiO_{3/2}$ [in formula (IV)]. These units are generally present in the organopolysiloxanes of formulas (I) and (IV) as more or less as impurities. Although this is not shown in these formulas, the organopolysiloxanes of formulas (I) and (IV) can also contain small amounts of hydroxyl groups which are bonded directly to silicon atoms and which are the result of the method by which these organopolysiloxanes are prepared. They generally contain hydroxyl groups that are bonded directly to silicon atoms in concentrations of from 10 to 1000 ppm based on the organopolysiloxanes of formula (I) or (IV). It is possible that the stabilization of the aforementioned organopolysiloxanes by the method of this invention is entirely or partially due to a substantial reduction in the Si-bonded hydroxyl groups present in the organopolysiloxanes.

In the method of this invention, compounds of formula (II) are preferably used in an amount of from 0.5 percent by weight up to about 1.0 percent by weight and more preferably from about 0.75 percent by weight to about 0.85 percent by weight, and the compounds of formula (III) are preferably used in an amount of from 0.1 percent by weight up to about 0.5 percent by weight, and more preferably from about 0.3 percent by weight up to about 0.4 percent by weight, based on the weight of the organopolysiloxane oil which is to be stabilized.

It is preferred that the method of this invention be carried out in the absence of a solvent.

Depending on the compounds of formula (II) and/or formula (III) which are used in the method of this invention, it may be advisable to prepare the stabilized organopolysiloxanes from low-boiling by-products and/or an excess of the compounds of formula (II) and/or (III). This can preferably be achieved by distillation, especially at temperatures between 100° and 110° C. and pressures below 1 kPa (absolute).

The method of this invention can be carried out batchwise, or semi-continuously, or as a continuous process. The continuous method is preferred.

In the following examples, all quantities are by weight unless otherwise specified. Also, all percents are by weight based on the weight of the organopolysiloxane oil. Unless otherwise provided, the tests of the examples were performed at atmospheric pressure, i.e., 1020 hPa (absolute) or approximately 1020 hPa (absolute). Low-boiling components were removed from the stabilized organopolysiloxane over a period of 30 minutes, at 150° C. and at a pressure of less than 100 Pa.

EXAMPLES

Silicon oils used:
Silicon oil "A":
Silicon oil "A" is a polydimethylsiloxane that is end-blocked by trimethylsiloxy groups which has a viscosity of 60,000 mm²s⁻¹ at 25° C. (commercially available from WackerChemie GmbH, under the designation AK 60,000);
Silicon oil "B":
Silicon oil "B" is a polymethylphenylsiloxane that is end-blocked by triphenylsiloxy groups which has a viscosity of 60,000 mm²S⁻¹ at 25° C. and whose diorganosiloxane units consist of 7 percent methylphenylsiloxane units and 93 percent dimethylsiloxane units. Silicon oil "B" is prepared in the following manner:

To a mixture containing 500 grams of an α,ω-dihydroxypolydiorganosiloxane having a viscosity of 175 mm²s⁻¹ at 25° C., whose diorganosiloxane units consist of 7 mol percent methylphenylsiloxane units and 93 mol percent dimethylsiloxane units, and 4 g of triphenylsilanol are added 400 ppm 3-[tris(trimethylsiloxy)silyl]-n-propyl-tri-n-butylphosphoniumhydroxide (prepared in accordance with German Patent Application No. 3,504,185). The resultant mixture is then stirred for 30 minutes at 0.1 Pa (absolute) and at 130° C. This mixture is then allowed to stand for 60 minutes at 1020 hPa (absolute) and at 150° C. After the volatile constituents have been distilled off at 0.1 Pa (absolute) and up to about 200° C., a clear oil is obtained.
Silicon oil "C":
Silicon oil "C" is a polymethylphenylsiloxane that is end-blocked by triphenylsilyl groups and has a viscosity of 100,000 mm²s⁻¹ at 25° C., in which the diorganosiloxane units consist of 14 mol percent methylphenylsiloxane units and 86 mol percent dimethylsiloxane units. Silicon oil "C" is prepared in accordance with the procedure described for silicon oil "B", except that the α,ω-dihydroxypolydiorganosiloxane has a viscosity of 200 mm²s⁻¹ at 25° C. and the diorganosiloxane units consist of 14 mol percent methylphenyl units and 86 mol percent dimethylsiloxane units and instead of 4 g of triphenylsilanol, only 3.5 g of triphenylsilanol are used. A clear oil is obtained.

Silicon oil "D":

Silicon oil "D" is a polymethylphenylsiloxane that is end-blocked by triphenylsilyl groups and has a viscosity of 60,000 mm²s⁻¹ at 25° C., in which the diorganosiloxane units consist of 7 mol percent diphenylsiloxane units and 93 mol percent dimethylsiloxane units. Silicon oil "D" is prepared in accordance with the procedure described for silicon oil "B", except that the α,ω-dihydroxypolydiorganosiloxane has a viscosity of 250 mm²s⁻¹ at 25° C. and the diorganosiloxane units consist of 7 mol percent diphenyl units and 93 mol percent dimethylsiloxane units. A clear oil is obtained.

The silicon oils "A", "B", "C" and "D" described above contain about 100 ppm of Si-bonded hydroxyl groups.

EXAMPLES 1 THROUGH 4

Batch process

The silicon oils "A" (example 1), "B" (example 2), "C" (example 3) and "D" (example 4), are each mixed with 0.1 percent by weight of hexamethyldisilazane and stirred in a sealed reaction flask equipped with a pressure equalizer for 72 hours at 100° C. At 150° C. and at a pressure of 0.1 Pa, the volatile components are distilled off for approximately 30 minutes. Infrared spectroscopy could not detect the presence of any Si-OH groups in the treated oils.

EXAMPLES 5 THROUGH 8

Batch process

The silicon oils "A" (example 5), "B" (example 6), "C" (example 7) and "D" (example 8) are each mixed with 0.4 percent by weight of N,N-bis-trimethylsilylacetamide and stirred for 1 hour in a sealed reaction flask equipped with a pressure equalizer. The volatile components are then distilled off over approximately 30 minutes at 150° C. and at 0.1 Pa. Infrared spectroscopy failed to detect any Si-OH groups in the treated oils.

EXAMPLES 9 THROUGH 12

Continuous process

Silicon oils "A" (example 9), "B" (example 10), "C" (example 11) and "D" (example 12) are each mixed with 0.1 percent by weight of N,N-bis-trimethylsilylacetamide and continuously pumped through a kneader at 150° C. and at 130 Pa (absolute). The average contact time is approximately 1 hour. Infrared spectroscopy could not detect any Si-OH groups in the treated oils.

EXAMPLE 17

Stability tests with respect to changes in viscosity

The oils in the following table are treated with dry nitrogen for 4 hours at 250° C. and during this time their decrease in viscosity is recorded by a printer that is connected to a digital Brookfield viscosimeter. The results are shown in Table 1.

TABLE 1

| Viscosity decrease after 4 hours at 250° C. | |
|---|---|
| Type of silicon | Viscosity decrease |
| Silicon oil "A", untreated | 25 percent |
| Silicon oil "A", stabilized per example 1 | 5 percent |
| Silicon oil "D", untreated | 20 percent |

TABLE 1-continued

| Viscosity decrease after 4 hours at 250° C. | |
|---|---|
| Type of silicon | Viscosity decrease |
| Silicon oil "D", stabilized per example 4 | 0 percent |

EXAMPLE 18

Use in a viscous clutch

A 40-disk viscous clutch is filled to the extent of 85 percent by volume with various silicon oils at a temperature of 25° C. The median distance between the disks is 0.5 mm. A motor supplied power to the drive shaft of the clutch. The number of revolutions is 200 s⁻¹. The other shaft remained motionless (rpm=0). It had a torque pickup connected to it. The viscous clutch is immersed in a thermostatic bath maintained at 75° C. The tests lasted 60 minutes each. The following results were obtained.

TABLE 2

| Silicon oil type | Viscosity decrease | Torque decrease |
|---|---|---|
| "A" | 48.5 percent | 35.0 percent |
| "A" stabilized (example 1) | 15.4 percent | 12.6 percent |
| "D" | 12.4 percent | 11.3 percent |
| "D" stabilized (example 4) | 6.9 percent | 5.5 percent |

What is claimed is:

1. A method for stabilizing organopolysiloxane oils containing triorganosiloxy groups in their terminal units, which comprises contacting the organopolysiloxane oils with a compound selected from the group consisting of the formulas $$R'_3SiX \text{ and } (R'_3Si)_2Y,$$

where R' is selected from the group consisting of monovalent hydrocarbon radicals having from 1 to 18 carbon atoms and halogenated monovalent hydrocarbon radicals having from 1 to 18 carbon atoms; X is selected from the group consisting of a halogen atom, a hydrogen atom, a hydroxyl group and a monovalent radical consisting of nitrogen, hydrogen, oxygen and has from 0 to 6 carbon atoms and which is bonded to the silicon atom via an oxygen or a nitrogen atom; Y is a divalent radical selected from the group consisting of an oxygen atom, a radical of the formula NH, a radical of the formula NR'', and a divalent radical consisting of nitrogen, hydrogen, oxygen and has from 0 to 6 carbon atoms, which is bonded to the silicon atoms via a group selected from oxygen, nitrogen and oxygen and nitrogen atoms and R'' represents a hydrocarbon radical having from 1 to 8 carbon atoms.

2. The method of claim 1, wherein the organopolysiloxane oil has the formula

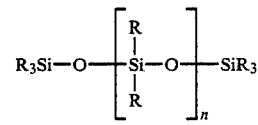

where R is selected from the group consisting of monovalent hydrocarbon radicals having from 1 to 18 carbon atoms and halogenated monovalent hydrocarbon radicals having from 1 to 18 carbon atoms and n is an integer having a value of from 1 to 3000.

3. The method of claim 1, wherein the organopolysiloxane oil has the formula

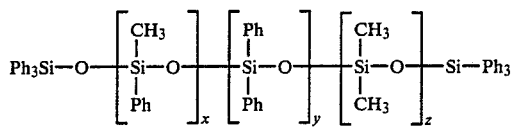

where Ph represents a phenyl radical and x, y and z each represent an integer having a value of from 0 to 3000.

4. The method of claims 1, 2 or 3, wherein R' represents radicals selected from the group consisting of methyl and phenyl radicals.

5. The method of claims 1, 2 or 3, wherein the compound is hexamethyldisilazane.

6. The method of claims 1, 2 or 3, wherein the organopolysiloxane oils are contacted with the compound at a temperature of from 20° to 200° C.

* * * * *